US009342629B2

(12) United States Patent
Zhang et al.

(10) Patent No.: US 9,342,629 B2
(45) Date of Patent: May 17, 2016

(54) CONTENT SEARCHING CHIP BASED PROTOCOL CONVERSION

(71) Applicant: Huawei Technologies Co., Ltd., Shenzhen (CN)

(72) Inventors: Xuefeng Zhang, Shenzhen (CN); Wenjie An, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/708,791

(22) Filed: May 11, 2015

(65) Prior Publication Data

US 2015/0242535 A1 Aug. 27, 2015

Related U.S. Application Data

(63) Continuation of application No. PCT/CN2013/086543, filed on Nov. 5, 2013.

(30) Foreign Application Priority Data

Dec. 6, 2012 (CN) .......................... 2012 1 0519718

(51) Int. Cl.
*G06F 13/20* (2006.01)
*G06F 17/30* (2006.01)
(Continued)

(52) U.S. Cl.
CPC .......... *G06F 17/30982* (2013.01); *G06F 12/12* (2013.01); *G06F 13/385* (2013.01);
(Continued)

(58) Field of Classification Search
CPC ..................................................... H03M 9/00
USPC .............................. 710/8–19, 71–74, 306–313
See application file for complete search history.

(56) References Cited

U.S. PATENT DOCUMENTS 2,010,025 A * 8/1935 Kirchner ................. E04F 15/12
404/20
6,961,796 B2 * 11/2005 Ang ..................... G06F 12/0831
710/29

(Continued)

FOREIGN PATENT DOCUMENTS

CN 101221538 A 7/2008
CN 101635747 A 1/2010

(Continued)

OTHER PUBLICATIONS

Partial English Translation and Abstract of Chinese Patent Application No. CN101635747A, May 6, 2015, 4 pages.

(Continued)

*Primary Examiner* — Raymond Phan
(74) *Attorney, Agent, or Firm* — Conley Rose, P.C.; Grant Rodolph

(57) ABSTRACT

A content searching chip and system based on a peripheral component interconnect (PCI) bus. The content searching chip includes a peripheral component interconnect interface module, a protocol conversion module, and a content storage module. The content storage module is connected to the protocol conversion module using an instruction bus and a data bus. The peripheral component interconnect interface module acquires a first processing layer data packet using the peripheral component interconnect bus; the protocol conversion module acquires the first processing layer data packet from a parallel bus provided between the protocol conversion module and the peripheral component interconnect interface module, parses and converts the first processing layer data packet to an operation request and data; the content storage module stores content, performs an operation according to the operation request, and returns operation response data; the instruction bus transmits the operation request, and the data bus transmits the data.

16 Claims, 2 Drawing Sheets

(51) Int. Cl.
*G06F 13/38* (2006.01)
*G06F 12/12* (2016.01)
*G06F 13/42* (2006.01)

(52) U.S. Cl.
CPC .......... *G06F13/387* (2013.01); *G06F 13/4221* (2013.01); *G06F 2212/69* (2013.01); *G06F 2213/0024* (2013.01); *G06F 2213/3852* (2013.01); *Y02B 60/1228* (2013.01); *Y02B 60/1235* (2013.01); *Y02B 60/188* (2013.01)

(56) References Cited

U.S. PATENT DOCUMENTS

| | | | |
|---|---|---|---|
| 7,185,172 B1 | 2/2007 | Mick et al. | |
| 7,246,191 B2 * | 7/2007 | Stanton | G06F 13/4027 710/306 |
| 8,762,595 B1 * | 6/2014 | Muller | G06F 13/14 710/22 |
| 2010/0257293 A1 * | 10/2010 | Xia | H04L 45/00 710/71 |

FOREIGN PATENT DOCUMENTS

| | | |
|---|---|---|
| CN | 101833424 A | 9/2010 |
| CN | 102291472 A | 12/2011 |
| CN | 103034602 A | 4/2013 |

OTHER PUBLICATIONS

Partial English Translation and Abstract of Chinese Patent Application No. CN103034602A, May 6, 2015, 3 pages.

Partial English Translation and Abstract of Chinese Patent Application No. CN101833424, May 19, 2015, 34 pages.

Foreign Communication From a Counterpart Application, PCT Application No. PCT/CN2013/086543, English Translation of International Search Report dated Feb. 27, 2014, 2 pages.

Foreign Communication From a Counterpart Application, PCT Application No. PCT/CN2013/086543, Written Opinion dated Feb. 27, 2014, 6 pages.

* cited by examiner

CONTENT SEARCHING CHIP BASED PROTOCOL CONVERSION

CROSS-REFERENCE TO RELATED APPLICATIONS

This application is a continuation of International Application No. PCT/CN2013/086543, filed on Nov. 5, 2013, which claims priority to Chinese Patent Application No. 201210519718.2, filed on Dec. 6, 2012, both of which are hereby incorporated by reference in their entireties.

TECHNICAL FIELD

The present invention relates to the field of communications and information technologies, and in particular, to a content searching chip and system based on a peripheral component interconnect bus.

BACKGROUND

In the communications field, hardware table lookup is completed using a content storage module. The content storage module can be implemented by a ternary content addressable memory (TCAM) chip, or a content addressable memory (CAM). However, a TCAM chip or a CAM chip in a later version uses a communication interface such as a high-speed serial interface protocol (Interlaken Look Aside, Interlaken-LA) interface or a dedicated CAM interface to receive and send a serial data packet. Therefore, an operation request written into the TCAM chip or the CAM chip, data to be written, a key value, and operation response data generated by the TCAM chip or the CAM chip need to be encapsulated as a serial data packet, which then is input or output through the Interlaken-LA interface or the CAM interface. In addition, a TCAM or CAM chip in an earlier version uses a specific parallel bus.

In the prior art, many processors often provide only a Peripheral Component Interconnect (PCI) interface or a peripheral component interconnect express (PCIe) interface instead of the Interlaken-LA interface or the specific CAM interface (such as, X86 series processors and ARM series processors that are widely applied at present).

However, sometimes, a system using an X86 series processor (such as an application security system) needs to use a TCAM or CAM chip to improve table lookup performance. As shown in FIG. 1, according to an implementation method in the prior art, a field-programmable gate array (FPGA) chip 102 is arranged between an X86 series processor 101 and a content storage module 103, the FPGA chip 102 is connected to the X86 series processor 101 using a PCI bus 104 and is connected to the content storage module 103 using a serial bus 105, the X86 series processor 101 communicates with the FPGA chip 102 using the PCI bus 104, and the FPGA chip communicates with the TCAM or CAM chip using the serial bus 105. The FPGA chip 102 converts physical layer data transmitted over the PCI bus 104 to a serial data packet transmitted over the serial bus 105, or converts a serial data packet transmitted over the serial bus 105 to physical layer data transmitted over the PCI bus 104.

In the foregoing solution of the prior art, because the FPGA chip needs to be arranged and logic development work for the FPGA chip is required, an application threshold is higher. In addition, power consumption of the FPGA chip is usually high. Therefore, using the FPGA chip increases power consumption and raises a cost. In addition, because the FPGA chip needs to convert physical layer data transmitted over a PCI bus to a serial data packet, conversion of a data format also results in longer data processing time.

SUMMARY

A main technical problem to be addressed in the present invention is to provide a content searching chip and system based on a PCI bus that are capable of effectively shortening data processing time and reducing power consumption and a cost.

In a first aspect, a chip searching chip is provided and includes a first PCI interface module, a protocol conversion module, and a content storage module. The protocol conversion module is connected to the first PCI interface module using a parallel bus, and the content storage module is connected to the protocol conversion module using an instruction bus and a data bus, where the first PCI interface module is configured to acquire a first processing layer data packet from a peripheral device using a PCI bus; the protocol conversion module is configured to acquire the first processing layer data packet from the first PCI interface module using the parallel bus, and parse and convert the first processing layer data packet to an operation request and data, where the operation request and the data can be identified by the content storage module; the content storage module is configured to store content, perform an operation according to the operation request, and return operation response data; the instruction bus is configured to transmit the operation request; and the data bus is configured to transmit data.

With reference to an implementation manner of the first aspect, in a first possible implementation manner, the data bus includes a key value bus configured to transmit a key value of content to be searched for when the operation request is a search operation request; and a search result returning bus configured to transmit a search result returned by the content storage module after performing searching according to the search operation request, where the search result includes a storage address of the content to be searched for.

With reference to an implementation manner of the first aspect, in a second possible implementation manner, the content storage module is further configured to send the operation response data to the protocol conversion module using the search result returning bus; and the protocol conversion module is further configured to encapsulate the operation response data as a second processing layer data packet and send the second processing layer data packet to the first PCI interface module over the parallel bus, where the first PCI interface module converts the second processing layer data packet to second processing layer data and sends the second processing layer data to the PCI bus.

With reference to an implementation manner of the first aspect, in a third possible implementation manner, the protocol conversion module generates a corresponding operation request according to an Fmt field and a Type field in a packet header of the first processing layer data packet.

With reference to the third possible implementation manner of the first aspect, in a fourth possible implementation manner, the operation request includes a content search request, an entry read request, an entry write request, a register read request, or an entry delete request.

With reference to the fourth possible implementation manner of the first aspect, in a fifth possible implementation manner, the protocol conversion module generates the content search request when detecting that, in the packet header of the first processing layer data packet, the Fmt field is 00 and the Type field is 00010; the protocol conversion module generates the entry read request when detecting that, in the packet header of the first processing layer data packet, the Fmt field is 00 or 01 and the Type field is 00000; the protocol conversion module generates the entry write request when detecting that, in the packet header of the first processing layer data packet, the Fmt field is 10 or 11 and the Type field is 00001; the protocol conversion module generates a register read request when detecting that, in the packet header of the first processing layer data packet, the Fmt field is 00 and the Type field is 00100; the protocol conversion module generates a register write request when detecting that, in the packet header of the first processing layer data packet, the Fmt field is 10 and the Type field is 00100; and the protocol conversion module generates an entry delete request when detecting that, in the packet header of the first processing layer data packet, the Fmt field is 10 and the Type field is 00101.

In a second aspect, a content searching system is provided. The content searching system includes the content searching chip in any one of the implementation manners of the first aspect and the first to the fifth possible implementation manners of the first aspect, and the content searching system further includes a processor chip, where the processor chip is provided with a second PCI interface module, and the second peripheral component interface module is connected to the first PCI interface module using the PCI bus.

With reference to an implementation manner of the second aspect, in a first possible implementation manner, the processor chip is an X86 series processor chip or an ARM series processor chip.

Different from a condition of the prior art, the content searching chip and system based on the PCI bus according to the embodiments of the present invention are provided with the PCI interface module, the protocol conversion module, and the content storage module, use the peripheral interconnection interface module to convert the physical layer data transmitted over an external PCI bus and an internal processing layer data packet, use the protocol conversion module to convert the processing layer data packet to an operation request, data to be written, and a key value that are applicable to the content storage module, and use the protocol conversion module to encapsulate operation response data generated by the content storage module as the processing layer data packet, thereby avoiding mutual conversion between the physical layer data on the PCI bus and a dedicated serial data packet of the content storage module. In addition, an FPGA chip with high power consumption is not required. Therefore, processing time may be effectively shortened and power consumption and a cost may be reduced.

BRIEF DESCRIPTION OF DRAWINGS

To describe the technical solutions in the embodiments of the present invention or in the prior art more clearly, the following briefly introduces the accompanying drawings required for describing the embodiments or the prior art. The accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. The described embodiments are a part rather than all of the embodiments of the present invention. All other embodiments obtained by persons of ordinary skill in the art based on the embodiments of the present invention without creative efforts shall fall within the protection scope of the present invention.

Figure 1:
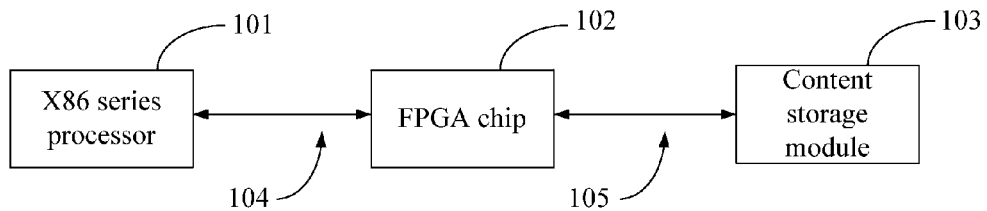
FIG. 1 is a schematic structural diagram of a content searching system using an FPGA chip to perform protocol conversion in the prior art.
Figure 2:
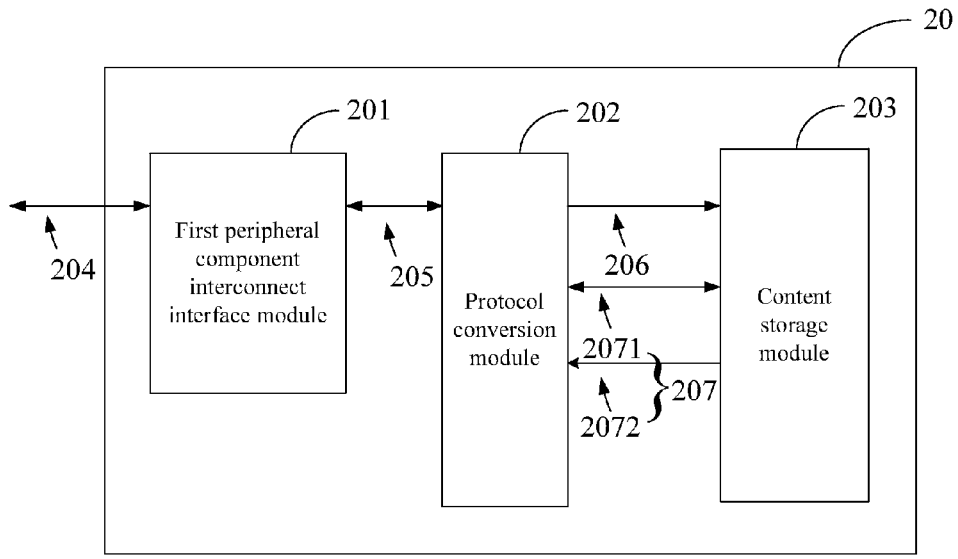
FIG. 2 is a schematic structural diagram of modules of a content searching chip based on a PCI bus according to an embodiment of the present invention.

FIG. 2 is a schematic structural diagram of modules of a content searching chip based on a PCI bus, according to an embodiment of the present invention. As shown in FIG. 2, a first embodiment of the present invention provides a content searching chip based on a PCI bus. The content searching chip includes a first PCI interface module 201, a protocol conversion module 202, and a content storage module 203. The protocol conversion module 201 is connected to the first PCI interface module 201 using a parallel bus 205, the content storage module 203 is connected to the protocol conversion module 202 using an instruction bus 206 and a data bus 207, where the first PCI interface module 201 acquires a first processing layer data packet from an external device (which is not illustrated in FIG. 2 and will be described below) using a PCI bus 204; the protocol conversion module 202 acquires the first processing layer data packet from the first PCI interface module 201 using the parallel bus 205, and parses and converts the first processing layer data packet to an operation request and data, where the operation request and the data can be identified by the content storage module 203; the content storage module 203 is configured to store content, perform an operation according to the operation request, and return operation response data; the instruction bus 206 is configured to transmit the operation request; and the data bus 207 is configured to transmit the data.

The content searching chip 20 is provided with the first PCI interface module 201, the protocol conversion module 202, and the content storage module 203, uses the first peripheral interconnection interface module 201 to acquire the first processing layer data packet from the PCI bus 204 and transmits the first processing layer data packet to the protocol conversion module 202 over the parallel bus 205, uses the protocol conversion module 202 to convert the first processing layer data packet to the operation request and the data, where the operation request and the data can be identified by the content storage module 203, and include an operation request and data based on a binary format. The processing of the protocol conversion module 202 avoids data format conversion in the prior art performed by an FPGA chip on physical layer data content transmitted over the PCI bus and a dedicated serial data packet of a memory chip. Therefore, processing time is effectively shortened and power consumption and a cost are reduced.

In one scenario, the data bus 207 may include a key value bus 2071 and a search result returning bus 2072. The key value bus 2071 is configured to transmit a key value of content to be searched for when the operation request is a search operation request; and the search result returning bus 2072 is configured to transmit a search result returned by the content storage module after performing searching according to the search operation, where the search result includes a storage address of the content to be searched for. In addition, the search result returning bus 2072 may also transmit the operation response data returned by the content storage module 203 after performing an operation according to the operation request. Certainly, it can be understood that, besides including the key value bus 2071 and the search result returning bus 2072, the data bus 207 may further include another data bus configured to transmit the data to be written to the content storage module 203.

In one scenario, when data is output from the content searching chip to an external device, the content storage module 203 is further configured to send the operation response data to the protocol conversion module 202 over the search result returning bus 2072; and the protocol conversion module 202 is further configured to encapsulate the operation response data as a second processing layer data packet and send the second processing layer data packet to the first PCI interface module 201 over the parallel bus, where the first PCI interface module 201 converts the second processing layer data packet to second physical layer data and sends the second physical layer data to the PCI bus 204.

Therefore, the content searching chip 20 of the present invention may further transmit the operation response data generated by the content storage module 203 to the PCI bus 204 in the foregoing manner.

Further, the content storage module 203 includes a CAM memory and a TCAM memory, where the CAM memory and the TCAM memory generally provide an instruction bus interface and a data bus interface. Therefore, the protocol conversion module 202 implements a circuit connection with the foregoing instruction bus interface using the instruction bus 206 and connects to the foregoing data bus interface using the data bus, to implement transmission of the operation instruction from the instruction bus 206 to the CAM memory or the TCAM memory and a function of transmitting data between the data bus 207 and the CAM memory or the TCAM memory.

Generally, a three-layer structure is defined in the PCI system, namely, a physical layer, a data link layer, and a processing layer. In the embodiments of the present invention, the first PCI interface module 201 includes a processing layer control module, a data link layer control module, and a physical layer control module. The physical layer control module acquires first physical layer data from the PCI bus 204, the data link layer control module converts the first physical layer data to first data link layer data, and the processing layer control module encapsulates the first data link layer data as the first processing layer data packet.

In addition, the processing layer control module acquires a second processing layer packet using the parallel bus 205, the data link layer control module converts the second processing layer data packet to second data link layer data, and the physical layer control module converts the second data link layer data to the second physical layer data, and sends the second physical layer data to the PCI bus 204.

Figure 3:
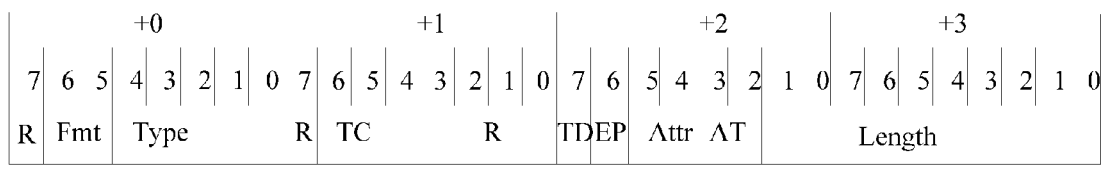
FIG. 3 is a schematic diagram of a data format of a packet header of a data conversion layer data packet in a PCI system.

In the PCI system, a processing layer data packet (that is, a Translation Layer Packet (TLP)) is defined as a basic data packet transmitted at the processing layer. The processing layer data packet mainly includes three parts: a packet header of the processing layer data packet (TLP Header), data payload, and TLP Digest. FIG. 3 shows a format of the packet header of the processing layer data packet.

As shown in FIG. 3, in the PCI system, an operation type of a TLP data packet (that is, a first data conversion layer data packet) defined by an Fmt field and a Type field in the packet header is illustrated in the following table:

| TLP Data Packet Type | Fmt Field | Type Field | Operation Type Indicated by the TLP Data Packet |
|---|---|---|---|
| MRd | 00 or 01 | 00000 | Reading memory request |
| MRdLk | 00 or 01 | 00001 | Locking the reading memory request |
| MWr | 1011 | 00000 | Memory write request |
| IORd | 00 | 00010 | I/O read request |
| IOWr | 10 | 00010 | I/O write request |
| CfgRd0 | 00 | 00100 | Register read type 0 |
| CfgWr0 | 10 | 00100 | Register write type 0 |
| CfgRd1 | 00 | 00101 | Register read type 1 |
| CfgWr1 | 10 | 00101 | Register write type 1 |
| TCfgRd | 00 | 11011 | Abandon TLP type 3 |
| TCfgWr | 10 | 11011 | Abandon TLP type 3 |

In the present invention, the protocol conversion module 202 converts the operation type indicated by the TLP data packet to an operation request for the content storage module 203. The protocol conversion module 202 generates the operation request that can be identified by the content storage module 203 according to the Fmt field and Type field in the packet header of the first processing layer data packet. The operation request may include an entry read request, an entry write request, a register read request, a register write request, an entry delete request, or a content search request. The protocol conversion module 202 generates the entry read request when detecting that, in the packet header of the first processing layer data packet, the Fmt field is 00 or 01 and the Type field is 00000, where the entry read request corresponds to the reading memory request indicated by the TLP data packet (that is, the first processing layer data packet); the protocol conversion module 202 generates the entry write request when detecting that, in the packet header of the first processing layer data packet, the Fmt field is 10 or 11 and the Type field is 00001, where the entry write request corresponds to the memory write request indicated by the TLP data packet (that is, the first processing layer data packet); the protocol conversion module 202 generates the register read request when detecting that, in the packet header of the first processing layer data packet, the Fmt field is 00 and the Type field is 00100, where the register read request corresponds to the register read type 0 indicated by the TLP data packet (that is, the first processing layer data packet); the protocol conversion module 202 generates the register write request when detecting that, in the packet header of the first processing layer data packet, the Fmt field is 10 and the Type field is 00100, where the register write request corresponds to the register write type 0 indicated by the TLP data packet (that is, the first processing layer data packet); the protocol conversion module 202 generates the entry delete request when detecting that, in the packet header of the first processing layer data packet, the Fmt field is 10 and the Type field is 00101, where the entry delete request corresponds to the register write type 1 indicated by the TLP data packet (that is, the first processing layer data packet); and the protocol conversion module 202 generates the content search request when detecting that, in the packet header of the first processing layer data packet, the Fmt field is 00 and the Type field is 00010, where the content search request corresponds to the input/output (I/O) read request indicated by the TLP data packet (that is, the first processing layer data packet).

In addition, the protocol conversion module 202 may acquire data to be written and a key value required when performing the corresponding operation from the data payload part of the processing layer data packet.

Therefore, the protocol conversion module 202 may convert the operation type indicated by the first processing layer data packet to the operation request for the content storage module 203 according to the foregoing conversion manner. The protocol conversion module 202 may be implemented using various logical circuit modules (such as a NAND gate) or embedded processors.

In addition, the content storage module 203 is connected to the protocol conversion module 202 using the instruction bus 206 and the data bus 207, acquires the operation request using the instruction bus 206, acquires the data using the data bus 207, performs the corresponding operation on the content storage module 203 according to the operation request and the data, and generates the operation response data. The data bus 207 includes a key value bus 2071 and a search result returning bus 2072. The data to be written and the key value are input to the content storage module 203 using the key value bus 2071, the content storage module 203 performs an entry read operation, an entry write operation, a register read operation, an entry delete operation, or a content search operation according to the operation request, the data to be written, and the key value, and inputs the operation response data generated in the foregoing operation to the protocol conversion module 202 using the search result returning bus 2072. The protocol conversion module 202 converts the operation response data to the second processing layer data packet and inputs the second processing layer data packet to the first PCI interface module 201. The processing layer control module of the first PCI interface module 201 converts the second processing layer data packet to the second data link layer data, and the data link layer control module converts the second data link layer data to the second physical layer data and outputs the second physical layer data to the PCI bus 204.

It should be noted that, on all existing and available content storage modules, the foregoing instruction bus interface, a key value bus interface, and a search result returning bus interface, or another parallel interface that can implement functions such as data transmission, an instruction operation, a key value, and result returning is configured. Therefore, the foregoing interface of the content storage module 203 is connected to the protocol conversion module 202 using the instruction bus 206, the key value bus 2071, and the search result returning bus 2072, and may directly acquire the entry read request, the entry write request, the register read request, the entry delete request, the content search request, the data to be written, or the key value converted by the protocol conversion module 202 according to the processing layer data packet. In this way, the interface of the content storage module 203 can perform entry reading on stored content according to the entry read request, perform entry writing on the content according to the entry write request, read a register according to the register read request, delete an entry from the content according to the entry delete request, and search for the content according to the content search request, where the data to be written or the key value required by the foregoing operations may be acquired using the key value bus 2071.

In the embodiments of the present invention, the content storage module 203 is directly controlled by the protocol conversion module 202, and the operation request and the data to be written or the key value required to perform the corresponding operation may be parsed from the processing layer data packet by the protocol conversion module 202. Therefore, compared with technical solution 1 in the prior art, the content searching chip 20 does not need to convert the processing layer data packet to a serial data packet and then parse the serial data packet to acquire data such as the entry read request, the entry write request, the register read request, the entry delete request, the content search request, the data to be written, or the key value. In addition, an FPGA chip with high power consumption is not required, thereby effectively shortening processing time and reducing power consumption and a cost.

Besides, the content searching chip 20 according to the embodiments of the present invention mainly implements an operation on the content storage module 203 using hardware, which has a higher processing speed compared with a software processing method.

When the operation request is the entry read request, the content storage module 203 performs the entry read operation internally according to the entry read request after acquiring the entry read request from the instruction bus 206, and generates operation response data including an entry read result, and uses the search result returning bus 2072 to send the operation response data including the entry read result to the protocol conversion module 202. Besides, the content storage module 203 may further acquire the data and the key value required by the entry read operation from the key value bus 2071, where the data and the key value are stored in the data payload part of the processing layer data packet.

Likewise, after acquiring the entry write request, the register read request, the entry delete request, or the content search request from the instruction bus 206, the content storage module 203 performs the corresponding operation internally according to the corresponding request, generate operation response data including a corresponding operation result, and uses the search result returning bus 2072 to send the operation response data including the operation result to the protocol conversion module 202. When necessary, the content storage module 203 may further acquire the data and the key value required by the operation from the key value bus 2071, where the data and the key value are stored in the data payload part of the processing layer data packet.

The foregoing operation response data includes the entry read result, the entry write result, the register read result, the register write result, the entry delete result, or the content search result.

Figure 4:
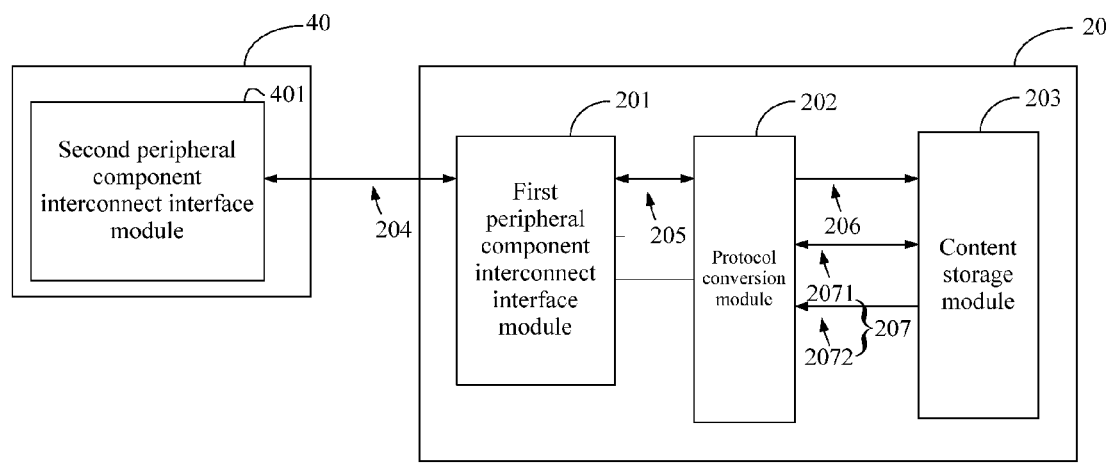
FIG. 4 is a schematic structural diagram of a content searching system based on a PCI bus according to an embodiment of the present invention.

An embodiment of the present invention further discloses a content searching system based on a PCI bus. FIG. 4 is a schematic structural diagram of a content searching system based on a PCI bus according to the embodiment of the present invention.

As shown in FIG. 4, the content searching system based on a PCI bus provided in the present invention includes a processor chip 20 and the content searching chip 20 based on a PCI bus illustrated in FIG. 2.

The processor chip 40 is provided with a second PCI interface module 401. The second PCI interface module 401 is connected to the first PCI interface module 201 using the PCI bus 204.

For example, the processor chip may be an X86 series processor chip or an ARM series processor chip.

The second PCI interface module 401 sends first physical layer data over the PCI bus 204, and the first PCI interface module 201 acquires the first physical layer data from the PCI bus 204 and converts the first physical layer data to first transmission layer data. The first PCI interface module 201 converts second transmission layer data to second physical layer data and sends the second physical layer data to the PCI bus 204. The second PCI interface module 401 acquires the second physical layer data from the PCI bus 204 and performs corresponding processing, thereby achieving communication between the processor chip 40 and a content searching chip 30.

Therefore, the content searching chip and system based on a PCI bus according to the embodiments of the present invention are provided with a PCI interface module, a protocol conversion module, and a content storage module, use the peripheral interconnection interface module to convert physical layer data transmitted over an external PCI bus and an internal processing layer data packet, use the protocol conversion module to convert the processing layer data packet to an operation request, data to be written, and a key value applicable to the content storage module, and use the protocol conversion module to encapsulate operation response data generated by the content storage module as a processing layer data packet, thereby avoiding mutual conversion between the physical layer data on the PCI bus and a dedicated serial data packet of the content storage module. In addition, an FPGA chip with high power consumption is not required. Therefore, processing time is effectively shortened and power consumption and a cost are reduced.

It may be clearly understood by persons skilled in the art that, for the purpose of convenient and brief description, for a detailed working process of the foregoing device and modules, reference may be made to the description of a corresponding process in the foregoing method embodiments, and details are not described herein again.

In the several embodiments provided in the present application, it should be understood that the disclosed device and method may be implemented in other manners. For example, the described apparatus embodiment is merely exemplary. For example, the module division is merely logical function division and may be other division in actual implementation. For example, a plurality of modules or components may be combined or integrated into another device, or some features may be ignored or not performed. In addition, the displayed or discussed mutual couplings or direct couplings or communication connections may be implemented through some communication interfaces. The indirect couplings or communication connections between the apparatuses or modules may be implemented in electronic, mechanical, or other forms.

The modules described as separate parts may or may not be physically separate, and parts displayed as modules may or may not be physical units, may be located in one position, or may be distributed on a plurality of network units. A part or all of the modules may be selected according to actual needs to achieve the objectives of the solutions of the embodiments.

In addition, functional modules in the embodiments of the present invention may be integrated into one processing module, or each of the modules may exist alone physically, or two or more modules are integrated into one module.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A content searching chip comprising:
a first peripheral component interconnect (PCI) interface;
a protocol conversion circuit coupled to the first PCI interface using a parallel bus; and
a content storage circuit, wherein the content storage circuit coupled to the protocol conversion circuit using an instruction bus and a data bus,
wherein the first PCI interface circuit is configured to acquire a first processing layer data packet from a peripheral device using a PCI bus,
wherein the protocol conversion circuit is configured to:
acquire the first processing layer data packet from the first PCI interface circuit using the parallel bus; and
parse and convert the first processing layer data packet to an operation request and data,
wherein the operation request and the data can be identified by the content storage circuit,
wherein the content storage circuit is configured to store content and return operation response data according to the operation request,
wherein the instruction bus is configured to transmit the operation request,
wherein the data bus is configured to transmit the data,
wherein the operation request comprises one of a content search request, an entry read request, an entry write request, a register read request, a register write request, or an entry delete request, and
wherein the protocol conversion circuit is configured to:
generate the content search request when detecting that, in the packet header of the first processing layer data packet, the Fmt field is 00 and the Type field is 00010;
generate the entry read request when detecting that, in the packet header of the first processing layer data packet, the Fmt field is 00 or 01 and the Type field is 00000;
generate the entry write request when detecting that, in the packet header of the first processing layer data packet, the Fmt field is 10 or 11 and the Type field is 00001;
generate the register read request when detecting that, in the packet header of the first processing layer data packet, the Fmt field is 00 and the Type field is 00100;
generate the register write request when detecting that, in the packet header of the first processing layer data packet, the Fmt field is 10 and the Type field is 00100; and
generate the entry delete request when detecting that, in the packet header of the first processing layer data packet, the Fmt field is 10 and the Type field is 00101.

2. The content searching chip according to claim 1, wherein the data bus comprises:
a key value bus configured to transmit a key value of content to be searched for when the operation request is a search operation request; and
a search result returning bus configured to transmit a search result returned by the content storage circuit after performing searching according to the search operation, wherein the search result comprises a storage address of the content to be searched for.

3. The content searching chip according to claim 1, wherein the protocol conversion circuit generates a corresponding operation request according to an Fmt field and a Type field in a packet header of the first processing layer data packet.

4. The content searching chip according to claim 2, wherein the content storage circuit is further configured to send the operation response data to the protocol conversion circuit over the search result returning bus, and wherein the protocol conversion circuit is further configured to:
encapsulate the operation response data as a second processing layer data packet; and
send the second processing layer data packet to the first PCI interface over the parallel bus, wherein the first PCI interface converts the second processing layer data packet to second processing layer data and sends the second processing layer data to the PCI bus.

5. A content searching system comprising:
a content searching chip, comprising:
- a first peripheral component interconnect (PCI) interface;
- a protocol conversion module coupled to the first PCI interface using a parallel bus; and
- a content storage module coupled to the protocol conversion module using an instruction bus and a data bus; and a processor chip,
wherein the first PCI interface module is configured to acquire a first processing layer data packet from the processor chip using a PCI bus,
wherein the protocol conversion module is configured to acquire the first processing layer data packet from the first PCI interface module using the parallel bus, and parse and convert the first processing layer data packet to an operation request and data,
wherein the operation request and the data can be identified by the content storage module,
wherein the content storage module is configured to store content and return operation response data according to the operation request,
wherein the instruction bus is configured to transmit the operation request,
wherein the data bus is configured to transmit the data, and
wherein the processor chip comprises a second PCI interface module, and the second PCI interface module is connected to the first PCI interface module using the PCI bus.

6. The content searching system according to claim 5, wherein the processor chip is an X86 series processor chip or an ARM series processor chip.

7. The content searching system according to claim 5, wherein the data bus comprises:
- a key value bus configured to transmit a key value of content to be searched for when the operation request is a search operation request; and
- a search result returning bus configured to transmit a search result returned by the content storage module after performing searching according to the search operation, wherein the search result comprises a storage address of the content to be searched for.

8. The content searching system according to claim 5, wherein the protocol conversion module generates a corresponding operation request according to an Fmt field and a Type field in a packet header of the first processing layer data packet.

9. The content searching system according to claim 5, wherein the operation request comprises one of the following: a content search request, an entry read request, an entry write request, a register read request, a register write request, or an entry delete request.

10. The content searching system according to claim 7, wherein the processor chip is an X86 series processor chip or an ARM series processor chip.

11. The content searching system according to claim 7, wherein the content storage module is further configured to send the operation response data to the protocol conversion module over the search result returning bus, and wherein the protocol conversion module is further configured to encapsulate the operation response data as a second processing layer data packet and send the second processing layer data packet to the first PCI interface module over the parallel bus, wherein the first PCI interface module converts the second processing layer data packet to second processing layer data and sends the second processing layer data to the PCI bus.

12. The content searching system according to claim 11, wherein the processor chip is an X86 series processor chip or an ARM series processor chip.

13. The content searching system according to claim 8, wherein the processor chip is an X86 series processor chip or an ARM series processor chip.

14. The content searching system according to claim 9, wherein the processor chip is an X86 series processor chip or an ARM series processor chip.

15. The content searching system according to claim 9, wherein the protocol conversion module is configured to:
- generate the content search request when detecting that, in the packet header of the first processing layer data packet, the Fmt field is 00 and the Type field is 00010;
- generate the entry read request when detecting that, in the packet header of the first processing layer data packet, the Fmt field is 00 or 01 and the Type field is 00000;
- generate the entry write request when detecting that, in the packet header of the first processing layer data packet, the Fmt field is 10 or 11 and the Type field is 00001;
- generate the register read request when detecting that, in the packet header of the first processing layer data packet, the Fmt field is 00 and the Type field is 00100;
- generate the register write request when detecting that, in the packet header of the first processing layer data packet, the Fmt field is 10 and the Type field is 00100; and
- generate the entry delete request when detecting that, in the packet header of the first processing layer data packet, the Fmt field is 10 and the Type field is 00101.

16. The content searching system according to claim 15, wherein the processor chip is an X86 series processor chip or an ARM series processor chip.

* * * * *